(12) United States Patent
Kuramochi et al.

(10) Patent No.: US 11,993,202 B2
(45) Date of Patent: May 28, 2024

(54) VEHICLE LIGHT DISTRIBUTION CONTROL APPARATUS

(71) Applicant: SUBARU CORPORATION, Tokyo (JP)

(72) Inventors: Hiroaki Kuramochi, Tokyo (JP); Masashi Okano, Tokyo (JP); Satoshi Nakano, Tokyo (JP); Shuhei Dairokuno, Tokyo (JP); Motohiro Hidaka, Tokyo (JP); Katsuyuki Umezawa, Tokyo (JP); Tatsuro Suzuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/219,357

(22) Filed: Jul. 7, 2023

(65) Prior Publication Data

US 2024/0017662 A1 Jan. 18, 2024

(30) Foreign Application Priority Data

Jul. 15, 2022 (JP) ................................. 2022-113978

(51) Int. Cl.
*B60Q 1/14* (2006.01)
*B60Q 1/08* (2006.01)

(52) U.S. Cl.
CPC .............. *B60Q 1/143* (2013.01); *B60Q 1/08* (2013.01); *B60Q 2300/112* (2013.01)

(58) Field of Classification Search
CPC ..... B60Q 1/143; B60Q 1/08; B60Q 2300/112
See application file for complete search history.

(56) References Cited

U.S. PATENT DOCUMENTS

| 11,216,748 B2 * | 1/2022 | Dhansri | ................. G01S 17/931 |
| 11,220,261 B2 * | 1/2022 | Eggert | .............. B60W 30/0953 |

(Continued)

FOREIGN PATENT DOCUMENTS

| JP | 2006-273092 A | 10/2006 |
| JP | 2009-73284 A | 4/2009 |

(Continued)

*Primary Examiner* — Arman B Fallahkhair
(74) *Attorney, Agent, or Firm* — TROUTMAN PEPPER HAMILTON SANDERS LLP (57) ABSTRACT

A vehicle light distribution control apparatus includes a first surrounding environment recognition device configured to recognize a surrounding environment around a vehicle and detect first object information in the recognized surrounding environment, and a second surrounding environment recognition device configured to acquire map information in a predetermined range based on the positional information of the vehicle, and second object information included in the acquired map information, and an illumination device configured to radiate illumination light. An illumination control unit is configured to compare the first object information and the second object information, identify objects that are detected in the second object information and are not detected in the first object information, set the objects as light distribution candidate objects respectively, set light distribution priority levels of the light distribution candidate objects respectively, and perform the light distribution control based on the light distribution priority levels.

6 Claims, 4 Drawing Sheets

(56) References Cited

U.S. PATENT DOCUMENTS

| | | | | |
|---|---|---|---|---|
| 11,661,061 B2* | 5/2023 | Spika | .................. | B60W 40/072 |
| | | | | 701/23 |
| 11,767,024 B2* | 9/2023 | Wang | ................... | G06V 20/582 |
| | | | | 701/36 |
| 11,780,473 B2* | 10/2023 | Ota | .................... | G08G 1/09685 |
| | | | | 701/23 |
| 11,790,665 B2* | 10/2023 | Bangalore Ramaiah | ..................... | |
| | | | | G06V 20/588 |
| | | | | 382/104 |
| 2010/0107970 A1 | 5/2010 | Kodama et al. | | |
| 2022/0365199 A1* | 11/2022 | Ingram | ................ | G01S 17/931 |
| 2023/0089023 A1* | 3/2023 | Mizoguchi | ........... | B60W 40/02 |
| | | | | 701/2 |
| 2023/0368545 A1* | 11/2023 | Godreau | .............. | G06V 10/764 |
| 2023/0419505 A1* | 12/2023 | Tang | ....................... | G06T 7/251 |

FOREIGN PATENT DOCUMENTS

| | | |
|---|---|---|
| JP | 2010-100073 A | 5/2010 |
| JP | 2010-105880 A | 5/2010 |

\* cited by examiner

VEHICLE LIGHT DISTRIBUTION CONTROL APPARATUS

CROSS-REFERENCE TO RELATED APPLICATION

The present application claims priority from Japanese Patent Application No. 2022-113978 filed on Jul. 15, 2022, the entire contents of which are hereby incorporated by reference.

BACKGROUND

The disclosure relates to a vehicle light distribution control apparatus that performs light distribution control for illumination light to be radiated from an illumination device of a vehicle.

In the field of vehicles such as automobiles, various light distribution control technologies have been proposed in, for example, Japanese Unexamined Patent Application Publication (JP-A) Nos. 2010-105880, 2010-100073, 2009-73284, and 2006-273092. In the light distribution control technology, various types of information are acquired as typified by a surrounding environment around a vehicle from various sensing devices, a steering angle, map information from a navigation system, or a face orientation or a line-of-sight direction of a driver who drives the vehicle. A traveling direction of the vehicle and a gazing point of the driver are recognized based on the acquired various types of information. The radiation range of illumination light to be radiated from an illumination device such as headlights is adjusted based on the recognized information.

SUMMARY

An aspect of the disclosure provides a vehicle light distribution control apparatus to be applied to a vehicle. The vehicle light distribution control apparatus includes a first surrounding environment recognition device, a vehicle positional information acquiring device, a second surrounding environment recognition device, an illumination device, and an illumination control unit. The first surrounding environment recognition device is configured to recognize a surrounding environment around the vehicle and detect first object information in the recognized surrounding environment. The vehicle positional information acquiring device is configured to acquire positional information of the vehicle. The second surrounding environment recognition device is configured to acquire map information in a predetermined range based on the positional information of the vehicle, and second object information included in the acquired map information. The illumination device is configured to radiate illumination light. The illumination control unit is configured to perform light distribution control on the illumination light to be radiated from the illumination device. The illumination control unit is configured to compare the first object information and the second object information, identify objects that are detected in the second object information and are not detected in the first object information, set the objects as light distribution candidate objects respectively, set light distribution priority levels of the light distribution candidate objects respectively, and perform the light distribution control based on the light distribution priority levels.

An aspect of the disclosure provides a vehicle light distribution control apparatus to be applied to a vehicle. The vehicle light distribution control apparatus includes an illumination device, one or more electronic control units. The illumination device is configured to radiate illumination light. The one or more electronic control units configured to: recognize a surrounding environment around the vehicle and detect first object information in the recognized surrounding environment; acquire positional information of the vehicle; acquire map information in a predetermined range based on the positional information of the vehicle, and second object information included in the acquired map information; and perform light distribution control on the illumination light to be radiated from the illumination device. The one or more electronic control units are configured to compare the first object information and the second object information, identify objects that are detected in the second object information and are not detected in the first object information, set the objects as light distribution candidate objects respectively, set light distribution priority levels of the light distribution candidate objects respectively, and perform the light distribution control based on the light distribution priority levels.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In the related art disclosed in JP-A Nos. 2010-105880, 2010-100073, 2009-73284, and 2006-273092, the light distribution control is performed based mainly on the traveling direction of the vehicle and the gazing point of the driver. Therefore, consideration is not given to objects in an area around the vehicle (driver) but outside the traveling direction of the vehicle and the gazing point of the driver, that is, objects that are not recognized by the traveling control apparatus of the vehicle or the driver because of nighttime during which the illumination light of the illumination device is used.

Examples of the objects that are not recognized by the vehicle (driver) in the nighttime include a crosswalk near an intersection, a pedestrian on the crosswalk, and a median strip at an oncoming lane or a crossroad.

For example, when the vehicle turns right at an intersection in the nighttime and an object such as a median strip is present near a crossroad and is not recognized clearly, a driving operation for causing the vehicle to travel toward a wrong traveling path may be performed due to the erroneous recognition.

It is desirable to provide a vehicle light distribution control apparatus that can suppress, for example, erroneous entry (such as wrong lane traveling) due to an erroneous operation caused when a traveling control apparatus of a vehicle or a driver erroneously recognizes a vehicle surrounding environment at an intersection or the like in the nighttime, and can perform light distribution control that may contribute to early recognition of a pedestrian or the like.

An embodiment of the disclosure is described below. The drawings for use in the following description are schematic drawings. To illustrate constituent elements in recognizable sizes in the drawings, dimensional relationships and scales of members may be varied among the constituent elements. The embodiment of the disclosure is not limited to the embodiment in the drawings in terms of the numbers, shapes, size ratios, and relative positional relationships of the constituent elements in the drawings.

The description of the configuration and operation of this embodiment is directed to a road system of left-hand traffic in which the traveling section of vehicles is a left side in a traveling direction. The configuration and operation of this embodiment are similarly applicable to a road system of right-hand traffic by switching right and left.

Figure 1:
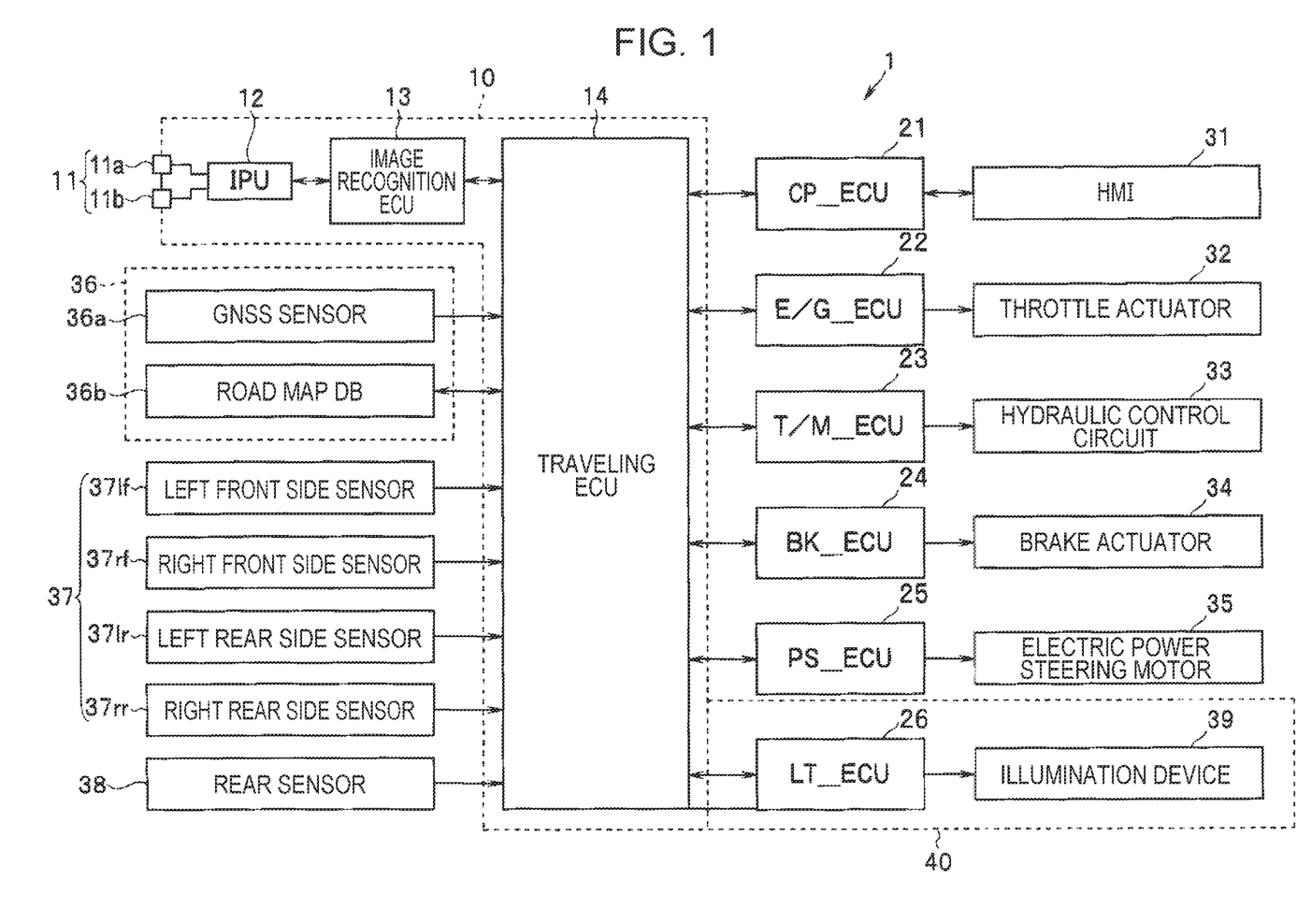
FIG. 1 is a block diagram illustrating a schematic configuration of a traveling control apparatus including a vehicle light distribution control apparatus according to an embodiment of the disclosure.

A schematic configuration of a traveling control apparatus including a vehicle light distribution control apparatus according to the embodiment of the disclosure is described below with reference to FIG. 1. FIG. 1 is a block diagram illustrating the schematic configuration of the traveling control apparatus including the vehicle light distribution control apparatus according to the embodiment of the disclosure.

In FIG. 1, the traveling control apparatus 1 basically has a configuration substantially similar to those of related-art traveling control apparatuses of the same type. Therefore, the following description is overall description of the traveling control apparatus 1 and detailed description is omitted.

The traveling control apparatus 1 includes a camera unit 10 fixed to an upper central part of a front area in a cabin of a vehicle including the traveling control apparatus 1 (hereinafter referred to as "first vehicle"). In one embodiment, the camera unit 10 may serve as an on-board camera device.

The camera unit 10 includes a stereo camera 11, an image processing unit (IPU) 12, an image recognition unit (image recognition ECU) 13, and a traveling control unit (traveling ECU) 14. ECUs are electronic control units installed in the vehicle (the first vehicle).

In one embodiment, the stereo camera 11 is a device that may serve as a recognizer configured to recognize a surrounding environment around the vehicle. The stereo camera 11 includes a main camera 11a and a subcamera 11b. For example, the main camera 11a and the subcamera 11b are disposed in the cabin of the first vehicle at bilaterally symmetrical positions across the center in a vehicle width direction to face a forward side (in the traveling direction).

For example, the main camera 11a and the subcamera 11b each include a CMOS image sensor. The main camera 11a and the subcamera 11b generate a stereoscopic image by acquiring two images of a surrounding environment in an external forward area within a predetermined range from different viewpoints in every predetermined synchronous imaging period. The generated stereoscopic image data is output to the IPU 12 as surrounding environment image data (image data indicating the surrounding environment during traveling of the first vehicle).

The IPU 12 receives the surrounding environment image data obtained by the stereo camera 11, and performs predetermined image processing for the received image data to detect edges of various target objects such as objects (moving object and stationary object) shown in the image when the image data is displayed and lane lines on a road surface. Thus, the IPU 12 recognizes the objects and lane lines around the vehicle. The IPU 12 acquires distance information from positional deviation amounts of corresponding edges in the right and left images, and generates image information including the distance information (distance image information). The generated distance image information is output to the image recognition ECU 13.

The image recognition ECU 13 obtains, based on the distance image information received from the IPU 12, a road curvature [1/m] between right and left lane lines of a road where the first vehicle is traveling (first-vehicle traveling road) and a width between the right and left lane lines (lane width). Various methods are known to obtain the road curvature and the lane width. For example, the image recognition ECU 13 obtains the road curvature in such a manner that right and left lane lines are recognized by binarization using a difference in brightness levels based on surrounding environment information and the curvatures of the right and left lane lines are obtained for each predetermined section by using a curve approximation expression based on the least-square method. The image recognition ECU 13 calculates the lane width from a difference in the curvatures of the right and left lane lines. The image recognition ECU 13 calculates, based on the curvatures of the right and left lane lines and the lane width, a vehicle lateral position deviation that is a distance from a lane center to the center of the first vehicle in the vehicle width direction.

The image recognition ECU 13 performs predetermined pattern matching for the distance image information to recognize three-dimensional objects such as stationary objects including guardrails along the road and curbstones and moving objects around the vehicle (including, for example, an oncoming vehicle, a preceding vehicle turning right or left, a preceding vehicle followed by the first vehicle, a bicycle, and a pedestrian).

In the recognition of three-dimensional objects, the image recognition ECU 13 recognizes, for example, types of the three-dimensional objects, heights of the three-dimensional objects, distances from the three-dimensional objects, speeds of the three-dimensional objects, relative speeds between the three-dimensional objects and the first vehicle, and relative distances between the three-dimensional objects (for example, a lateral distance between a roadside curbstone and a lane line nearby).

In one embodiment, the image recognition ECU 13 of the traveling control apparatus 1 together with the stereo camera 11 and the IPU 12 may serve as a "first surrounding environment recognition device" configured to recognize a first surrounding environment around the vehicle. The various types of information recognized by the image recognition ECU 13 are first surrounding environment information and output to the traveling ECU 14. In one embodiment, the first surrounding environment information may serve as "first object information".

The traveling ECU 14 is a control unit that centrally controls the traveling control apparatus 1. Various control units such as a cockpit control unit (CP_ECU) 21, an engine control unit (E/G_ECU) 22, a transmission control unit (T/M_ECU) 23, a brake control unit (BK_ECU) 24, a power steering control unit (PS_ECU) 25, and an illumination control unit (LT_ECU) 26 are coupled to the traveling ECU 14 via an internal communication network such as a controller area network (CAN).

Various sensors such as a locator unit 36, on-board radar devices 37, and a rear sensor 38 are coupled to the traveling ECU 14.

A human-machine interface (HMI) 31 disposed near a driver's seat is coupled to the CP_ECU 21. For example, the HMI 31 includes a switch for giving instructions to execute various types of drive assist control, a mode selection switch for switching driving modes, a steering touch sensor that detects a steering wheel holding state of a driver, a driver monitoring system (DMS) that performs facial authentication of the driver and detects a line of sight, a touch panel display, a combination of meters, and a loudspeaker. In one embodiment, the touch panel display may serve as a display panel.

In response to a control signal from the traveling ECU 14, the CP_ECU 21 notifies the driver as appropriate by display and sound through the HMI 31 about various types of information related to, for example, various alerts for a preceding vehicle, the status of the drive assist control, and the surrounding environment around the first vehicle. The CP_ECU 21 outputs, to the traveling ECU 14, various types of information input by the driver through the HMI 31, such as ON/OFF operations on various types of drive assist control.

For example, a throttle actuator 32 of an electronically controlled throttle is coupled to an output side of the E/G_ECU 22. Various sensors such as an accelerator sensor (not illustrated) are coupled to an input side of the E/G_ECU 22.

The E/G_ECU 22 controls drive of the throttle actuator 32 based on, for example, a control signal from the traveling ECU 14 or detection signals from various sensors. Thus, the E/G_ECU 22 adjusts the intake amount of an engine to generate desired engine power. The E/G_ECU 22 outputs, to the traveling ECU 14, signals of an accelerator operation amount and the like detected by various sensors.

A hydraulic control circuit 33 is coupled to an output side of the T/M_ECU 23. Various sensors such as a shift position sensor (not illustrated) are coupled to an input side of the T/M_ECU 23.

The T/M_ECU 23 performs hydraulic control for the hydraulic control circuit 33 based on, for example, a signal of an engine torque estimated by the E/G_ECU 22 and detection signals from various sensors. Thus, the T/M_ECU 23 changes the engine power at a desired speed ratio by operating, for example, friction engagement elements and pulleys in an automatic transmission. The T/M_ECU 23 outputs, to the traveling ECU 14, signals of a shift position and the like detected by various sensors.

A brake actuator 34 for adjusting brake fluid pressures to be output to brake wheel cylinders in individual wheels is coupled to an output side of the BK_ECU 24. Various sensors such as a brake pedal sensor, a yaw rate sensor, a longitudinal acceleration sensor, and a vehicle speed sensor (not illustrated) are coupled to an input side of the BK_ECU 24.

The BK_ECU 24 controls drive of the brake actuator 34 based on a control signal from the traveling ECU 14 or detection signals from various sensors. Thus, the BK_ECU 24 generates, for the wheels as appropriate, braking forces for forcible braking control and yaw rate control on the first vehicle. The BK_ECU 24 outputs, to the traveling ECU 14, signals of a brake operation status, a yaw rate, a longitudinal acceleration, a vehicle speed (first-vehicle speed), and the like detected by various sensors.

An electric power steering motor 35 for applying a steering torque of a rotational force from a motor to a steering mechanism is coupled to an output side of the PS_ECU 25. Various sensors such as a steering torque sensor and a steering angle sensor are coupled to an input side of the PS_ECU 25.

The PS_ECU 25 controls drive of the electric power steering motor 35 based on a control signal from the traveling ECU 14 or detection signals from various sensors. Thus, the PS_ECU 25 generates the steering torque for the steering mechanism. The PS_ECU 25 outputs, to the traveling ECU 14, signals of a steering torque, a steering angle, and the like detected by various sensors.

An illumination device 39 is coupled to the LT_ECU 26. The illumination device 39 includes various lights mounted on the vehicle, such as illumination lamps, signal lamps, and indicator lamps. Examples of the illumination lamps include headlights, fog lamps, side illumination lamps, a license plate lamp, reversing lamps, and an interior roof lamp. Examples of the signal lamps include direction indicator lamps, stop lamps, tail lamps, parking lamps, side marker lamps, and lateral lamps. Examples of the indicator lamps include display illuminations of meters, switches, an air conditioner, and an audio device.

The illumination device 39 may include actuators (not illustrated) that mechanically drive a part of the illumination lamps (for example, headlights, fog lamps, or side illumination lamps) for light distribution control.

The LT_ECU 26 receives a control signal from the traveling ECU 14 and controls drive of the illumination device 39. In particular, the LT_ECU 26 performs desired light distribution control by mechanical or electrical drive control on illumination lamps (for example, headlights, fog lamps, or side illumination lamps) for radiating illumination light to the outside of the vehicle (mainly forward) among the lights of the illumination device 39. Thus, the LT_ECU 26 and the illumination device 39 constitute a light distribution control apparatus 40 of this embodiment in cooperation with the traveling ECU 14.

A known configuration and a known control technology of the illumination device 39 are applied to the light distribution control. Examples of the configuration of the illumination device 39 include actuators that turn the illumination lamps laterally (right or left) by desired angles with respect to the vehicle traveling direction. Thus, the radiation direction of light to be radiated from the illumination lamps can be changed as appropriate.

Examples of the configuration of the illumination device 39 further include a shade that blocks a part of the illumination light and an actuator that drives the shade at a predetermined timing as appropriate. Thus, the light distribution characteristic can be changed by blocking a part of the light radiated from the illumination lamp.

Examples of the configuration of the illumination device 39 further include a configuration in which light sources are provided and light distribution to a desired radiation range can be changed as appropriate by individually controlling the lighting statuses of the light sources.

For example, the light distribution control apparatus 40 of this embodiment has a configuration using any one of the configuration examples described above or a combination of two or more configuration examples described above.

The light distribution control is not limited to control on the headlights alone. Auxiliary illumination lamps (such as fog lamps or side illumination lamps) may be provided in addition to the headlights, and the lighting of the auxiliary illumination lamps may be controlled at a predetermined timing in addition to the lighting control on the headlights.

Thus, the light distribution control is adjustment to effectively radiate illumination light toward objects around the vehicle by adjusting radiation angles or diffusion conditions of illumination light from the illumination light sources in the illumination device 39 or by driving the illumination lamps as appropriate.

The locator unit 36 includes a GNSS sensor 36a and a high-accuracy road map database 36b (hereinafter referred to as "road map DB 36b").

The GNSS sensor 36a measures the position (latitude, longitude, and altitude) of the first vehicle by receiving positioning signals from positioning satellites. Thus, the GNSS sensor 36a acquires positional information of the first vehicle.

The road map DB 36b is a large-capacity storage medium such as a hard disk drive (HDD) or a solid state drive (SSD), and stores high-accuracy road map information (local dynamic map). For example, the high-accuracy road map information has a layered structure similar to that of a global dynamic map in a cloud server (not illustrated). That is, the road map information includes four layers of information including static information and quasi-static information mainly constituting road information, and quasi-dynamic information and dynamic information mainly constituting traffic information.

The static information includes information to be updated at a relatively long-term frequency, for example, monthly, as typified by information on roads and structures on roads, lane information, road surface information, and permanent traffic regulation information.

The static information corresponds to substantially fixed and static positional information such as road types (ordinary road or expressway), road shapes, right and left lane lines (for example, center line, outer line, lane boundary line, and median strip), exits of expressways and bypass roads, lengths between entrance and exit (start and end points) of branch lanes and merging lanes leading to junctions, rest areas, and parking areas, road signs, and road marks (stop lines, crosswalks, and direction signs).

The quasi-static information includes information to be updated at a relatively short-term frequency, for example, hourly, as typified by traffic jam information, navigation and traffic regulation information related to accidents, roadwork, or events, wide-area weather information, and traffic jam prediction.

The quasi-dynamic information includes information to be updated at a short-term frequency, for example, minutely, as typified by actual traffic jam information at every observation timing, traveling regulations, temporary traveling obstruction information related to fallen objects and obstacles, actual accident information, and narrow-area weather information.

The dynamic information includes information to be updated at a very short-term frequency, for example, every second, as typified by information transmitted and received between moving objects, current traffic light information, information on pedestrians and two-wheel vehicles in intersections, and information on vehicles traveling straightforward across intersections.

For example, the road map DB 36b stores lane width data, lane center position coordinate data, lane azimuth angle data, and speed limits as lane data for use in autonomous driving. The stored lane data includes pieces of data for several-meter intervals in each lane on the road map.

Based on, for example, a request signal from the traveling ECU 14, the road map DB 36b outputs, to the traveling ECU 14, second surrounding environment information in road map information in a set range around the position of the first vehicle that is measured by the GNSS sensor 36a. In one embodiment, the second surrounding environment information may serve as "second object information".

In one embodiment, the road map DB 36b of the traveling control apparatus 1 together with the GNSS sensor 36a may serve as a "second surrounding environment recognition device" configured to recognize a second surrounding environment around the vehicle. The information acquired by the GNSS sensor 36a and the road map DB 36b is the second surrounding environment information and transmitted to the image recognition ECU 13 as the second object information.

The on-board radar devices 37 are sensors including millimeter wave radars. Each millimeter wave radar detects a three-dimensional object such as a pedestrian or another vehicle and a structure (three-dimensional object such as a curbstone, a guardrail, a wall of a building, or a plant) along a roadside (for example, an end at a road shoulder) by outputting radio waves and analyzing the reflected radio waves from the objects. Each millimeter wave radar also detects a three-dimensional obstacle on a road. For example, each radar detects a width of the three-dimensional object, a position of a representative point of the three-dimensional object (position and distance relative to the vehicle), and a relative speed as specific information related to the three-dimensional object.

In the example of FIG. 1, the on-board radar devices 37 include four sensors (right front side sensor 37rf, left front side sensor 37lf, right rear side sensor 37rr, and left rear side sensor 37lr).

Among the four sensors, the right front side sensor 37rf and the left front side sensor 37lf are disposed on, for example, right and left sides of a front bumper. The right front side sensor 37rf and the left front side sensor 37lf detect, as third surrounding environment information, three-dimensional objects in right and left obliquely forward and side areas around the first vehicle. Those areas are difficult to recognize from an image captured by the stereo camera 11.

For example, the right rear side sensor 37rr and the left rear side sensor 37lr are disposed on right and left sides of a rear bumper. The right rear side sensor 37rr and the left rear side sensor 37lr detect, as the third surrounding environment information, three-dimensional objects in right and left obliquely rearward and side areas around the first vehicle. Those areas are difficult to recognize by the right front side sensor 37rf and the left front side sensor 37lf.

In one embodiment, the on-board radar devices 37 of the traveling control apparatus 1 may serve as a third surrounding environment recognition device configured to recognize a third surrounding environment around the vehicle. The information acquired by the on-board radar devices 37 is transmitted to the image recognition ECU 13.

Examples of the rear sensor 38 include a sonar device. For example, the rear sensor 38 is disposed on the rear bumper. The rear sensor 38 detects three-dimensional objects in a rearward area behind the first vehicle as fourth surrounding environment information. This area is difficult to recognize by the right rear side sensor 37rr and the left rear side sensor 37lr.

In one embodiment, the rear sensor 38 of the traveling control apparatus 1 may serve as a fourth surrounding environment recognition device configured to recognize a fourth surrounding environment around the vehicle. The information acquired by the rear sensor 38 is transmitted to the image recognition ECU 13.

Coordinates of the external targets in the first surrounding environment information recognized by the camera unit 10 including the image recognition ECU 13, the second surrounding environment information recognized by the locator unit 36, the third surrounding environment information recognized by the on-board radar devices 37, and the fourth surrounding environment information recognized by the rear sensor 38 are converted by the traveling ECU 14 into coordinates in a three-dimensional coordinate system having its origin at the center of the first vehicle.

The traveling ECU 14 has driving modes such as a manual driving mode, a first traveling control mode, a second traveling control mode, and a limp home mode. The traveling ECU 14 can selectively switch the driving modes based on, for example, a status of operation on the mode selection switch of the HMI 31.

In each of the driving modes, the traveling ECU 14 determines whether to execute obstacle avoidance control involving autonomous emergency braking (AEB: collision damage reduction braking) control and emergency steering control in response to recognition of a three-dimensional obstacle such as a preceding vehicle or a fallen object on a first-vehicle traveling road with a strong possibility of colliding with the first vehicle, and executes predetermined control as appropriate.

All or part of the locator unit 36, the image recognition ECU 13, the traveling ECU 14, the CP_ECU 21, the E/G_ECU 22, the T/M_ECU 23, the BK_ECU 24, and the PS_ECU 25 are/is a processor including hardware.

For example, the processor is constituted by known components and their peripheral devices including a central processing unit (CPU), a random access memory (RAM), a read only memory (ROM), a non-volatile memory, a non-volatile storage, and a non-transitory computer readable medium.

The ROM, the non-volatile memory, and the non-volatile storage prestore software programs to be executed by the CPU and fixed data such as data tables. The CPU reads the software programs stored in the ROM and the like and executes the software programs by loading the software programs in the RAM. The software programs implement the functions of the components and units (13, 14, 21 to 25, 36) by referring to various types of data as appropriate.

The processor may be implemented by a semiconductor chip such as a field programmable gate array (FPGA). The components and units (13, 14, 21 to 25, 36) may be implemented by electronic circuits.

The software programs may entirely or partly be recorded as computer program products in a non-transitory computer readable medium such as a portable sheet medium typified by a flexible disk, a CD-ROM, or a DVD-ROM, a card memory, a hard disk drive (HDD), or a solid state drive (SSD).

In one embodiment, a monocular camera may serve as the "first surrounding environment recognition device" in place of (or in addition to) the stereo camera 11 in the camera unit 10. In one embodiment, a light detection and ranging (LiDAR) sensor may be used in place of (or in addition to) the on-board radar devices 37.

Figure 2:
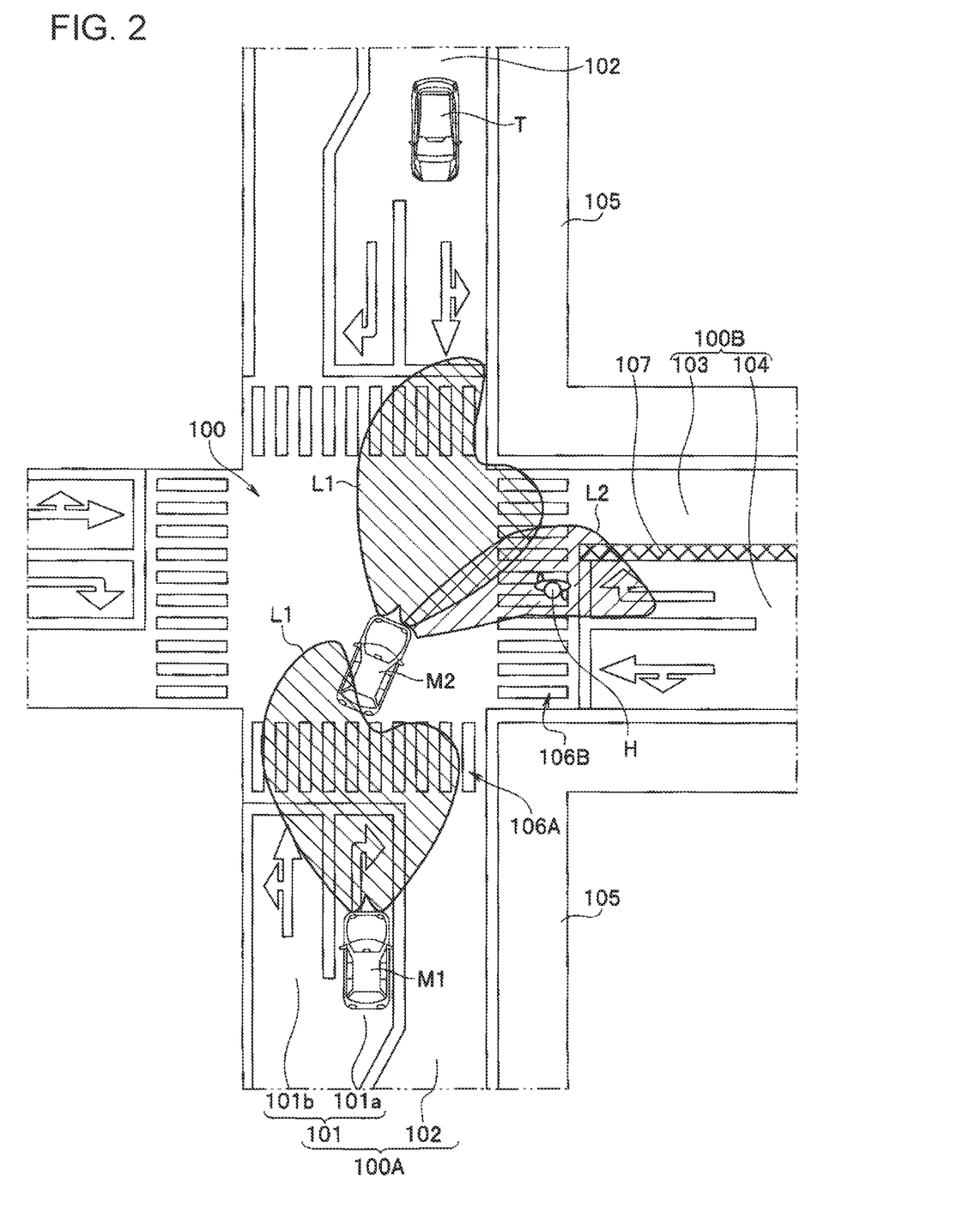
FIG. 2 is a diagram illustrating operations of the light distribution control apparatus according to the embodiment of the disclosure in a specific situation in which light distribution control is performed.
Figure 3:
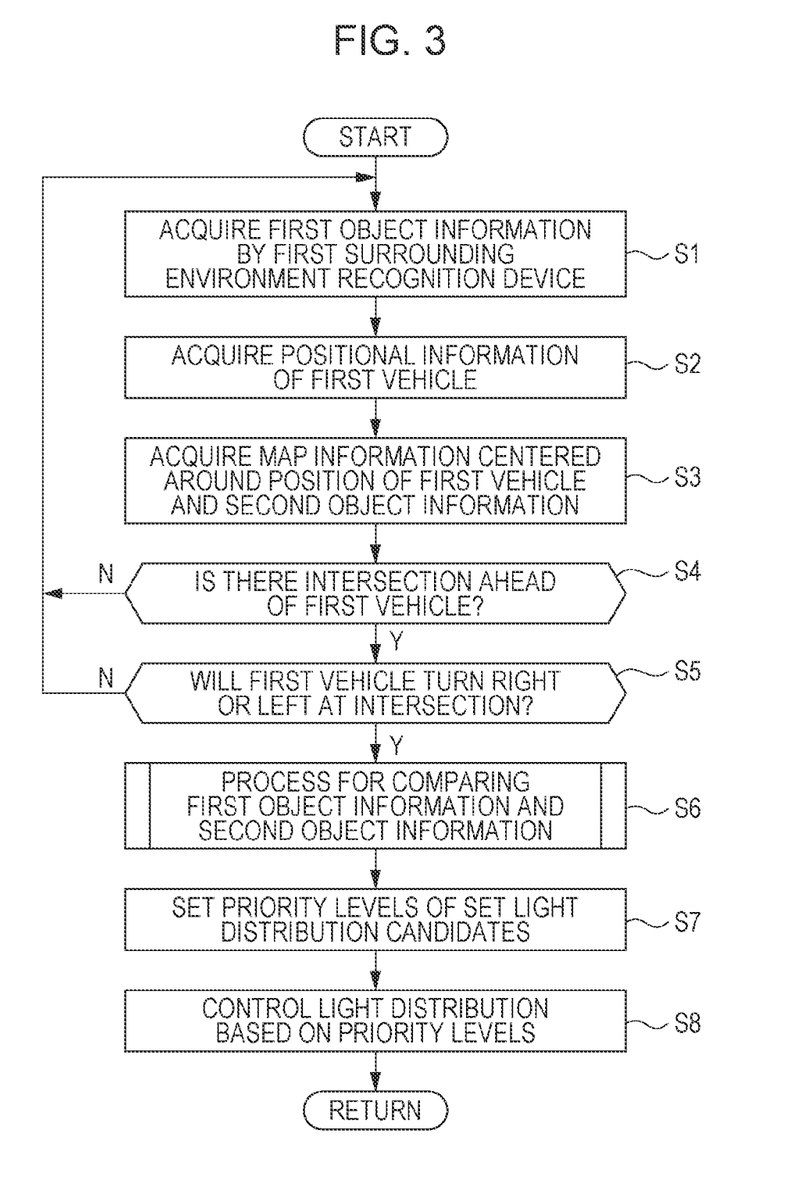
FIG. 3 is a flowchart of a light distribution control process to be performed by the light distribution control apparatus according to the embodiment of the disclosure.
Figure 4:
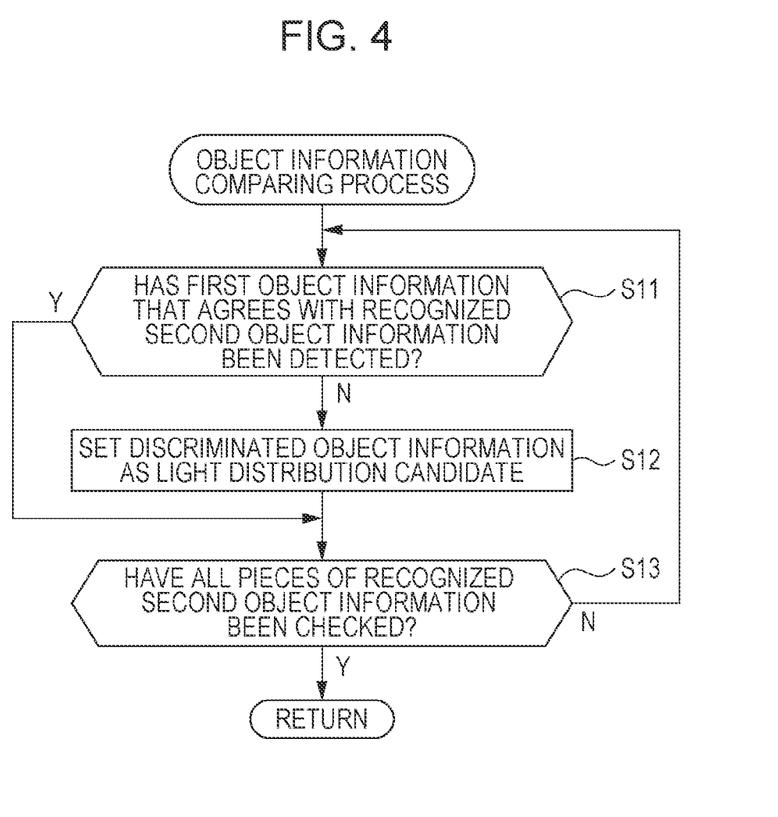
FIG. 4 is a flowchart illustrating a subroutine of an object information comparing process (process of Step S6) in the flowchart of FIG. 3.

Operations of the light distribution control apparatus of this embodiment in the traveling control apparatus 1 having the configuration described above is described below. FIGS. 2 to 4 are diagrams illustrating the operations of the light distribution control apparatus according to the embodiment of the disclosure. FIG. 2 is a diagram illustrating a specific situation in which the light distribution control is performed. FIG. 3 is a flowchart of a light distribution control process to be performed by the light distribution control apparatus according to the embodiment of the disclosure. FIG. 4 is a flowchart illustrating a subroutine of an object information comparing process (process of Step S6) in the flowchart of FIG. 3.

Reference symbols in FIG. 2 are described below. In FIG. 2, reference symbols M1 and M2 represent the first vehicle including the traveling control apparatus 1 including the light distribution control apparatus 40 of this embodiment. The reference symbol M1 represents the first vehicle traveling before entering an intersection. The reference symbol M2 represents the first vehicle waiting for right turn after entering the intersection.

In the following description, the first vehicle may be referred to as "first vehicle M" by using a reference symbol M irrespective of the situational position (M1, M2) in FIG. 2.

The example of FIG. 2 is directed to nighttime after sunset during which the vehicle uses the illumination device such as headlights.

In FIG. 2, a reference symbol T represents a second vehicle traveling near the first vehicle M. Examples of the second vehicle T in FIG. 2 include a vehicle traveling straightforward in an oncoming lane.

In FIG. 2, a reference symbol H represents a pedestrian near the first vehicle M. Examples of the pedestrian H in FIG. 2 include a pedestrian on a crosswalk in a traveling path along which the first vehicle M will turn right.

In FIG. 2, a reference symbol 100 represents an intersection on a road where the first vehicle M and the second vehicle T are traveling. The intersection 100 is a point where two straight roads 100A and 100B cross each other.

The straight road 100A includes a lane 101 where the first vehicle M is traveling (hereinafter referred to as "first-vehicle lane 101"), and a lane 102 that faces the first-vehicle lane 101 (hereinafter referred to as "oncoming lane 102"). The first-vehicle lane 101 near the intersection 100 includes a right-turn lane 101a and a straightforward/left-turn lane 101b.

FIG. 2 illustrates the first vehicle M1 traveling in the right-turn lane 101a at a position (M1) behind the intersection 100, and the first vehicle M2 waiting for right turn at a position (M2) on an extension line of the right-turn lane 101a after the first vehicle M has entered the intersection 100.

The straight road 100B (hereinafter referred to as "crossroad 100B") intersecting the straight road 100A including the first-vehicle lane 101 (hereinafter referred to simply as "straight road 100A") includes two lanes 103 and 104. The first vehicle M will travel along the lane 103 after turning right at the position represented by the reference symbol M2 in FIG. 2. The lane 104 is an oncoming lane for the lane 103. The lane 104 has a structure similar to that of the first-vehicle lane 101 (includes a right-turn lane and a straightforward/left-turn lane).

The crossroad 100B includes a median strip 107 (cross-hatched part) at a boundary between the lanes 103 and 104.

In FIG. 2, a reference symbol 105 represents a sidewalk. In FIG. 2, reference symbols 106A and 106B represent crosswalks. The crosswalk 106A is provided across the straight road 101A including the first-vehicle lane 101. The crosswalk 106B is provided across the crossroad 100B.

The situation in which the light distribution control is performed by the light distribution control apparatus 40 of this embodiment is briefly described below with reference to FIG. 2.

As illustrated in FIG. 2, the first vehicle M including the traveling control apparatus 1 including the light distribution control apparatus 40 of this embodiment is traveling near the intersection 100 in the nighttime. At this time, the first vehicle M is traveling while radiating illumination light from the illumination device 39.

In FIG. 2, the first vehicle M traveling toward the intersection 100 is expected to turn right at the intersection 100. At this time, the oncoming second vehicle T is traveling in the oncoming lane 102 toward the intersection 100.

In this case, the first vehicle M enters the right-turn lane 101*a* behind the intersection 100 (see the reference symbol M1 in FIG. 2). At this time, the first vehicle M performs the light distribution control on the illumination light from the illumination device 39 (for example, headlights) to irradiate a range represented by a reference symbol L1 in FIG. 2. In the radiation range L1, the light distribution control is performed to reduce the radiation range near the oncoming lane 102 by recognizing the oncoming second vehicle T in the oncoming lane 102. Such light distribution control is realized by a known technology.

After the first vehicle M has entered the intersection 100 in this state, the first vehicle M waits for right turn while temporarily stopping at a predetermined position in the intersection 100 (see the reference symbol M2 in FIG. 2). At the position M2 of the first vehicle M in FIG. 2, the radiation range L1 at the position M1 of the first vehicle M continues as the radiation range L1 of the illumination device 39 of the first vehicle M.

In this situation of FIG. 2, for example, a part of the crosswalk 106B is irradiated in the radiation range L1 of the illumination device 39 of the first vehicle M at the position M2. However, the illumination light is not sufficiently radiated to a rightward area from the first vehicle M, that is, an area to which the first vehicle M is expected to travel.

In this case, there is a possibility that the first surrounding environment recognition device (11, 12, 13) does not detect objects (for example, the median strip 107, the crosswalk 106B, and the pedestrian H on the crosswalk 106B) present in the area in this direction (traveling direction of the first vehicle M).

In this situation, the light distribution control apparatus 40 of this embodiment refers to the second object information recognized by the second surrounding environment recognition device (36*a*, 36*b*) to discriminate the objects that may not be detected by the first surrounding environment recognition device (11, 12, 13). Then, the light distribution control is performed to radiate the illumination light to an area including the discriminated objects. The resulting additional radiation range is represented by a reference symbol L2 in FIG. 2.

As described above, the crosswalk 106B and the median strip 107 present in the traveling direction of the first vehicle M (rightward frontal area or right side area) are taken as the specific examples of the objects that are recognized by the second surrounding environment recognition device (36*a*, 36*b*) but may not be detected by the first surrounding environment recognition device (11, 12, 13). The target objects are not limited to those objects and may be other objects.

Details of the light distribution control process to be performed by the light distribution control apparatus 40 of this embodiment in this situation are described below with reference to the flowcharts of FIGS. 3 and 4.

The first vehicle M including the traveling control apparatus 1 including the light distribution control apparatus 40 of this embodiment is traveling in the situation of FIG. 2. While the first vehicle M is traveling, the traveling control apparatus 1 of the first vehicle M is continuously performing the process of recognizing the surrounding environment around the traveling first vehicle M by using various sensor devices.

In Step S1 of FIG. 3, the traveling control apparatus 1 acquires first object information by recognizing a first surrounding environment around the first vehicle M by using the first surrounding environment recognition device, that is, the camera unit 10 including the stereo camera 11, the IPU 12, and the image recognition ECU 13.

For example, the first object information indicates a three-dimensional object that is present around (mainly ahead of) the first vehicle M and may be recognized in an image captured by the stereo camera 11. Examples of the three-dimensional object include a stationary object typified by a structure on a road (guardrail, curbstone, median strip, or crosswalk) and a moving object typified by a vehicle, a bicycle, or a pedestrian moving along the road.

When the traveling control apparatus 1 of the traveling first vehicle M recognizes, for example, an oncoming second vehicle in an oncoming lane, the light distribution control apparatus 40 performs known light distribution control in consideration of the oncoming second vehicle. In the situation of FIG. 2, the first vehicle M has already performed the known light distribution control in consideration of the oncoming second vehicle T (or an oncoming second vehicle (not illustrated) recognized previously). In the example of FIG. 2, the light distribution control is performed in the light distribution pattern represented by the reference symbol L1 for the radiation range of the headlights of the first vehicle M.

In Step S2, the traveling control apparatus 1 acquires positional information (latitude, longitude, and altitude) of the first vehicle M that is measured by the GNSS sensor 36*a* (second surrounding environment recognition device).

In Step S3, the traveling control apparatus 1 acquires map information centered around the position of the first vehicle from the road map DB 36*b* (second surrounding environment recognition device) based on the positional information of the first vehicle M that is acquired in the process of Step S2. Simultaneously, the traveling control apparatus 1 acquires second surrounding environment information (second object information) in the acquired map information centered around the position of the first vehicle.

For example, the second object information indicates a three-dimensional object that is present around (mainly ahead of) the first vehicle M and is in the map information. Examples of the three-dimensional object include a stationary object typified by a structure on a road (guardrail, curbstone, median strip, or crosswalk) and a moving object typified by a vehicle, a bicycle, or a pedestrian moving along the road. The vehicle, the bicycle, or the pedestrian corresponding to the dynamic information may be excluded from the map information.

In Step S4, the traveling control apparatus 1 determines whether the intersection 100 is present ahead of the first vehicle M based on the acquired map information (acquired by the second surrounding environment recognition device) or the acquired image information (acquired by the first surrounding environment recognition device). When determination is made that the intersection 100 is present ahead of the first vehicle M, the process proceeds to Step S5. When the intersection 100 is not present ahead of the first vehicle M, the process returns to Step S1 and the same process is repeated subsequently.

In Step S5, the traveling control apparatus 1 determines whether the first vehicle M will turn right or left at the intersection 100 determined in Step S4. Whether the first vehicle M will turn right or left may be determined by, for example, checking the state of the direction indicator of the first vehicle M.

The driver may preset a traveling route to a destination on the road map by using a navigation device or the like. In this case, the traveling direction (whether the first vehicle will turn either right or left or travel straightforward) at the intersection 100 ahead can be determined based on the traveling route set on the road map and the map information centered around the position of the first vehicle.

The fact that the first vehicle M will turn right at the intersection 100 can be determined also by, for example, determining that the first vehicle M has entered the right-turn lane 101a.

When determination is made that the first vehicle M will turn right or left in the process of Step S5, the process proceeds to Step S6.

When the first vehicle M travels straightforward without turning right or left at the intersection 100 ahead, a loop process is performed to return to the process of Step S1. In this case, the first vehicle M traveling straightforward may keep the current light distribution control and determination is made not to change the light distribution control. Therefore, when determination is made that the first vehicle M will travel straightforward at the intersection 100, the loop process is performed to return to the process of Step S1.

In Step S6, the traveling control apparatus 1 performs the object information comparing process for comparing the recognized and detected first object information and the recognized second object information. The object information comparing process is a process of determining whether multiple pieces of second object information recognized by the second surrounding environment recognition device (36a, 36b) are detected by the first surrounding environment recognition device (11, 12, 13).

During nighttime traveling, the radiation range of the illumination device 39 is generally limited. Therefore, all the pieces of second object information (that is, objects that may be present clearly) in the map information centered around the position of the first vehicle are not always detected by the first surrounding environment recognition device (11, 12, 13).

In view of this, the traveling control apparatus 1 performs the object information comparing process for comparing the first object information actually detected by the first surrounding environment recognition device (11, 12, 13) and the recognized second object information, thereby discriminating the object that is recognized and present as the second object information but is not detected as the first object information. Details of the object information comparing process are described below with reference to the flowchart of FIG. 4.

In Step S11 of FIG. 4, the traveling control apparatus 1 determines whether first object information that agrees with predetermined second object information among the multiple pieces of recognized second object information has been detected.

When the first object information that agrees with the recognized second object information has not been detected, the process proceeds to Step S12. When the first object information that agrees with the recognized second object information has been detected, the process proceeds to Step S13.

In Step S12, the traveling control apparatus 1 sets the object information discriminated in the process of Step S11 as a light distribution candidate object. The light distribution candidate object means a candidate for an object to be subjected to the subsequent light distribution control. Then, the process proceeds to Step S13.

In Step S13, the traveling control apparatus 1 determines whether all the objects indicated by the pieces of recognized second object information have been checked. When all the objects indicated by the pieces of recognized second object information have not been checked, the process returns to Step S11 and the same process is repeated subsequently. When all the objects indicated by the pieces of recognized second object information have been checked, the process returns to the original process (RETURN) and proceeds to Step S7 of FIG. 3.

In the above description, all the objects indicated by the pieces of recognized second object information are checked in the process of Step S13, but this process is not restrictive. For example, when determination is made that the first vehicle M will turn right in the process of Step S5 of FIG. 3, objects in a leftward frontal area and a left side area from the first vehicle M may be excluded. Therefore, at least a part of the objects indicated by the pieces of recognized second object information may be checked in the process of Step S13 depending on the traveling direction of the first vehicle M. For example, when the first vehicle M is expected to turn right, the pieces of second object information mainly in the rightward frontal area and the right side area from the first vehicle M may be checked.

In Step S7 of FIG. 3, the traveling control apparatus 1 sets priority levels of the light distribution candidates set in the process of Step S12. The priority levels of the light distribution candidates are set for the following reason. That is, it is difficult to radiate the illumination light to all the objects that are not detected by the first surrounding environment recognition device (11, 12, 13) among the multiple pieces of second object information recognized by the second surrounding environment recognition device (36a, 36b). All the undetected objects need not be recognized.

The light distribution control may be performed on any appropriate area out of the area including the undetected objects. Therefore, the light distribution control apparatus 40 of this embodiment sets the priority levels of the discriminated light distribution candidates and the light distribution control is performed on an area mainly including an object having a high priority level.

The priority levels of the light distribution candidates are set as follows. For example, the first vehicle M is expected to turn right at the intersection 100 in the nighttime as in the situation of FIG. 2.

As illustrated in FIG. 2, the first vehicle M is stopping to wait for right turn at the predetermined position M2 in the intersection 100. The illumination device 39 of the first vehicle M normally radiates the illumination light mainly forward. Predetermined light distribution control may have already been performed depending on, for example, the surrounding situation before the first vehicle M enters the intersection 100.

For example, when the light distribution control is continuously performed in consideration of an oncoming second vehicle before the first vehicle M enters the intersection 100, the radiation range L1 may be irradiated as illustrated in FIG. 2.

This light distribution pattern is applied to the following specific example. For example, the oncoming vehicle passes on the right side for the first vehicle M traveling along a road in the system of left-hand traffic. To reduce glare and dazzling for the oncoming second vehicle, the first vehicle M performs the light distribution control to suppress light distribution to, for example, the forward right side in the normal radiation range of the headlights of the illumination device 39. Thus, the radiation range L1 is set as illustrated in FIG. 2.

In general, the first object information that may actually be detected by the first surrounding environment recognition device (11, 12, 13) of the first vehicle M traveling in the nighttime is limited substantially within the radiation range L1 of the illumination light of the illumination device 39. The recognition range of the driver of the first vehicle M is also limited substantially within the radiation range L1.

Therefore, the first surrounding environment recognition device (11, 12, 13) cannot detect all the various objects actually present around the first vehicle M. Particularly in the nighttime, detection of objects in an area outside the radiation range of the illumination light of the headlights of the first vehicle M tends to be difficult.

For example, in the situation of FIG. 2, the majority of the crosswalk 106B, the pedestrian H walking on the crosswalk 106B, and the median strip 107 on the crossroad 100B are outside the radiation range L1. Therefore, there is a possibility that those objects are not detected by the first surrounding environment recognition device (11, 12, 13) (or not recognized by the driver).

When the objects that are not detected by the first surrounding environment recognition device (11, 12, 13) (or not recognized by the driver) are set as the light distribution candidates, the priority levels are set depending on, for example, the traveling direction of the vehicle.

For example, when the vehicle turns right at the intersection, it is desirable to grasp the surrounding environment (objects etc.) in the rightward frontal area and the right side area (areas in the direction in which the vehicle is expected to travel) in addition to the frontal area.

When the vehicle turns right, high priority levels are set for objects in the rightward frontal area and the right side area. When the vehicle turns right, low priority levels may be set for objects in, for example, the leftward area and the left side area. For example, high priority levels are set for objects such as a crosswalk or a median strip.

For example, a pedestrian may be present on the crosswalk. In particular, a crosswalk in the rightward area for the vehicle expected to turn right is located on a traveling path where the vehicle will travel after the right turn. In the example of FIG. 2, this crosswalk corresponds to the crosswalk 106B for the first vehicle waiting for right turn at the position M2.

In general, the pedestrian is not included in the map information because the pedestrian is the dynamic information. For example, when the crosswalk 106B can be irradiated, the pedestrian H who may be present on the crosswalk 106B can also be irradiated as a result. Thus, a high priority level is set for the crosswalk 106B in the rightward area or the right side area.

For example, the median strip 107 on the crossroad 100B may erroneously be recognized as a curbstone (not illustrated) on the crossroad 100B. As illustrated in FIG. 2, when the median strip 107 on the crossroad 100B is an object that is not clearly included in the radiation range L1 in the nighttime and is not detected by the first surrounding environment recognition device (11, 12, 13) (or not recognized by the driver), the first vehicle M (driver) may erroneously recognize the lane 104 of the crossroad 100B as a traveling road after the right turn. Thus, a high priority level is set for the median strip 107 in the rightward area or the right side area.

In FIG. 2, no traffic light is particularly illustrated at the intersection 100. For example, in a case where the traffic light for the first vehicle M is green when the intersection 100 is observed ahead, the recognition of a stop line or the like as the first object information and the second object information may be omitted as appropriate. In a case where the first vehicle M travels straightforward through the intersection 100 and the traffic light for the first vehicle M is green, the recognition of a stop line or the like may particularly be omitted. In this case, a low priority level is set for the object information of the stop line or the like.

In a case where the traffic light for the first vehicle M is red, it is appropriate to recognize the stop line or the like. When the normal light distribution control is performed, the radiation range may be secured so that the object such as the stop line ahead can be detected or recognized by the first surrounding environment recognition device (11, 12, 13) and the second surrounding environment recognition device (36a, 36b) without specially changing the light distribution control. When the stop line or the like is not detected by the first surrounding environment recognition device (11, 12, 13) and is set as the light distribution candidate, a low priority level is set for the stop line or the like.

In this manner, the priority levels of the light distribution candidates are set in the process of Step S7 of FIG. 3. Then, the process proceeds to Step S8.

In Step S8, the illumination control unit (LT_ECU) 26 of the light distribution control apparatus 40 performs the light distribution control based on the priority levels set in the process of Step S7. In the example of FIG. 2, the light distribution control is performed to add the radiation range L2 of FIG. 2.

For example, in a case where the traveling of the oncoming second vehicle T may be affected (dazzling etc.) as a result of the light distribution control based on the set priority levels, the light distribution is limited in addition to the light distribution control to set the radiation range L2 or the radiation range is additionally adjusted. Then, the series of processes is finished and the process returns to the original process (RETURN).

By performing the light distribution control based on the priority levels, the illumination device 39 of the first vehicle M radiates the illumination light to, for example, the radiation range represented by the reference symbol L2 in FIG. 2 in addition to the radiation range represented by the reference symbol L1 in FIG. 2.

Since the radiation range L2 is irradiated (the illumination light is radiated to the objects in the rightward area and the right side area from the first vehicle M), the first surrounding environment recognition device (11, 12, 13) can detect the objects in the radiation range L2. Further, the driver can recognize the objects.

In the process sequence described above, the light distribution control is started at the timing immediately after the process sequence of FIG. 4 is completed and the priority level setting process of FIG. 3 is completed, but the start timing is not limited to this timing.

For example, the immediate start of the light distribution control is not effective when the priority level setting process of FIG. 3 is completed but the distance between the first vehicle M and the target object is sufficiently long. Therefore, the light distribution control may be started when the distance between the first vehicle M and the target object has decreased to a predetermined distance or shorter.

For example, the light distribution control may be started at a timing when a predetermined duration or longer has elapsed in a state in which objects are not detected as the first object information.

According to the embodiment described above, the first vehicle M traveling at the intersection or the like in the nighttime can perform appropriate light distribution control on the illumination light for the object that is difficult to recognize in the surrounding environment (not detected by the first surrounding environment recognition device (11, 12, 13)) but may be recognized by the second surrounding environment recognition device (36a, 36b).

Through the light distribution control, the object that cannot be detected by the first surrounding environment recognition device (11, 12, 13) can securely be recognized by radiating the illumination light.

Thus, it is possible to reduce the possibility of the erroneous operation based on the driver's erroneous recognition of the vehicle surrounding environment, thereby suppressing, for example, erroneous entry into the traveling path (such as wrong lane traveling) due to the erroneous operation. Further, the pedestrian or the like can be recognized early.

The embodiment described above is directed to the example of the light distribution control to be performed when the first vehicle M recognizes the intersection 100 ahead and turns right at the intersection 100, but the light distribution control is not limited to this example. For example, the light distribution control by the light distribution control apparatus 40 of this embodiment is similarly applicable to the case where the first vehicle M turns left at the intersection 100. In this case, the light distribution control may be performed focusing on objects in the leftward area and the left side area.

Also in situations other than the situation in which the first vehicle M turns right or left at the intersection 100, the light distribution control may be performed as appropriate depending on the situation of the surrounding environment.

The embodiment of the disclosure is not limited to the embodiment described above, and various modifications and applications may be made without departing from the gist of the disclosure. The embodiment includes various aspects of the disclosure that may be extracted by any appropriate combination of the disclosed constituent elements. For example, some of the constituent elements in the embodiment may be omitted as long as the problems described above can be solved and the effects described above can be attained. The constituent elements of different embodiments may be combined as appropriate. The embodiment of the disclosure is limited to the appended claims but not limited to specific modes of implementation.

According to the embodiment of the disclosure, it is possible to provide the vehicle light distribution control apparatus that can suppress, for example, the erroneous entry (such as wrong lane traveling) due to the erroneous operation caused when the traveling control apparatus of the vehicle or the driver erroneously recognizes the vehicle surrounding environment at the intersection or the like in the nighttime, and can perform the light distribution control that may contribute to early recognition of a pedestrian or the like.

The light distribution control apparatus 40 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the light distribution control apparatus 40. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle light distribution control apparatus to be applied to a vehicle, the vehicle light distribution control apparatus comprising:
a first surrounding environment recognition device configured to recognize a surrounding environment around the vehicle and detect first object information in the recognized surrounding environment;
a vehicle positional information acquiring device configured to acquire positional information of the vehicle;
a second surrounding environment recognition device configured to acquire map information in a predetermined range based on the positional information of the vehicle, and second object information included in the acquired map information;
an illumination device configured to radiate illumination light; and
an illumination control unit configured to perform light distribution control on the illumination light to be radiated from the illumination device,
wherein the illumination control unit is configured to
compare the first object information and the second object information,
identify objects that are detected in the second object information and are not detected in the first object information,
set the objects as light distribution candidate objects respectively,
set light distribution priority levels of the light distribution candidate objects respectively, and
perform the light distribution control based on the light distribution priority levels.

2. The vehicle light distribution control apparatus according to claim 1, wherein the light distribution control is started at a timing when the objects are identified.

3. The vehicle light distribution control apparatus according to claim 1, wherein the light distribution control is started at a timing when the objects are identified and a distance between the vehicle and each of the objects has decreased to a predetermined distance or shorter.

4. The vehicle light distribution control apparatus according to claim 1, wherein the light distribution control is started at a timing when the objects are identified and a predetermined duration or longer has elapsed in a state in which the objects are not detected in the first object information.

5. The vehicle light distribution control apparatus according to claim 1, wherein the illumination control unit is configured to perform the light distribution control when an intersection is recognized ahead of the vehicle and the vehicle is expected to turn right or left at the intersection.

6. A vehicle light distribution control apparatus to be applied to a vehicle, the vehicle light distribution control apparatus comprising
- an illumination device configured to radiate illumination light,
- one or more electronic control units configured to:
  - recognize a surrounding environment around the vehicle and detect first object information in the recognized surrounding environment;
  - acquire positional information of the vehicle;
  - acquire map information in a predetermined range based on the positional information of the vehicle, and second object information included in the acquired map information; and
  - perform light distribution control on the illumination light to be radiated from the illumination device,
- wherein the one or more electronic control units are configured to:
  - compare the first object information and the second object information;
  - identify objects that are detected in the second object information and are not detected in the first object information;
  - set the objects as light distribution candidate objects respectively;
  - set light distribution priority levels of the light distribution candidate objects respectively; and
  - perform the light distribution control based on the light distribution priority levels.

* * * * *